United States Patent
Deffler et al.

(10) Patent No.: US 6,385,610 B1
(45) Date of Patent: May 7, 2002

(54) METHOD AND APPARATUS FOR IDENTIFYING AND VISUALIZING DIFFERENCES IN OBJECT MODEL DIAGRAMS

(75) Inventors: Tad A. Deffler, Boonton; Alexander Kosowski, Hamilton Square, both of NJ (US); Sastry Nanduri, Sunnyvale, CA (US)

(73) Assignee: Computer Associates Think, Inc., Islandia, NY (US)

(*) Notice: Subject to any disclaimer, the term of this patent is extended or adjusted under 35 U.S.C. 154(b) by 0 days.

(21) Appl. No.: 09/419,736

(22) Filed: Oct. 16, 1999

Related U.S. Application Data

(60) Provisional application No. 60/104,682, filed on Oct. 16, 1998.

(51) Int. Cl.[7] .............................................. G06F 17/30
(52) U.S. Cl. ........................... 707/6; 707/103; 707/104; 707/100; 707/102
(58) Field of Search ........................... 707/6, 100, 102, 707/103, 104

(56) References Cited

U.S. PATENT DOCUMENTS

| | | | | |
|---|---|---|---|---|
| 5,245,675 A | * | 9/1993 | Ferre et al. | ................... 382/27 |
| 5,481,718 A | | 1/1996 | Ryu et al. | |
| 5,638,381 A | * | 6/1997 | Cho et al. | ................. 371/22.4 |
| 5,644,764 A | | 7/1997 | Johnson et al. | |
| 5,721,925 A | | 2/1998 | Cheng et al. | |
| 5,724,425 A | * | 3/1998 | Chang et al. | ................. 380/25 |
| 5,987,123 A | * | 11/1999 | Scott et al. | ..................... 380/3 |

FOREIGN PATENT DOCUMENTS

| | | | | |
|---|---|---|---|---|
| EP | 0396310 | * | 11/1990 | ................... 15/60 |

OTHER PUBLICATIONS

"Logic Works Releases Beta of Object–Relational Modeling Tool for Universal Server Databases", downloaded from microway.com.au/press/logic umabeta.htm Informix Worldwide User Conference, San Francisco, CA. Jul. 22, 1997.

\* cited by examiner

*Primary Examiner*—Frantz Coby
(74) *Attorney, Agent, or Firm*—Baker & McKenzie

(57) ABSTRACT

A method for comparing a first model and a second model. The method includes identifying metadata in the first model and in the second model and calculating a first set of signatures for objects of the metadata of the first model and a second set of signatures for objects of the metadata of the second model. The objects of the first model and the objects of the second model corresponding with each other have the same signatures. The method also includes determining which signatures of the first set of signatures match signatures of the second set of signatures. The method also includes determining for the matching signatures, whether the objects associated with the signatures of the first set of signatures equal the objects associated with the signatures of the second set of signatures.

3 Claims, 2 Drawing Sheets

METHOD AND APPARATUS FOR IDENTIFYING AND VISUALIZING DIFFERENCES IN OBJECT MODEL DIAGRAMS

CROSS-REFERENCE TO RELATED APPLICATIONS

The present application claims benefit of the filing date of U.S. patent application Ser. No. 60/104,682 entitled MODELING TOOL SYSTEMS AND METHODS, filed on Oct. 16, 1998.

The present application is related to a co-pending U.S. patent application Ser. No. 09/420,223 entitled APPARATUS AND METHOD FOR MODELING TOOLS, being concurrently filed on the same day, which is incorporated by reference herein in its entirety.

The present application is related to a co-pending U.S. patent application Ser. No. 09/419,731 entitled METHOD FOR IMPACT ANALYSIS OF A MODEL, being concurrently filed on the same day, which is incorporated by reference herein in its entirety.

The present application is related to co-pending U.S. patent application Ser. No. 09/419,749 entitled METHOD AND SYSTEM FOR AN EXTENSIBLE MACRO LANGUAGE, being concurrently filed on the same day, which is incorporated by reference herein in its entirety.

The present application is related to co-pending U.S. patent application Ser. No. 09/418,751 entitled METHOD AND APPARATUS FOR PROVIDING ACCESS TO A HIERARCHICAL DATA STORE THROUGH AN SQL INPUT, being concurrently filed on the same day, which is incorporated by reference herein in its entirety.

FIELD OF THE INVENTION

The present invention relates to determining differences between two or more models.

BACKGROUND INFORMATION

Comparisons between items such as files are conventional. Products have been provided that compare files such as word processing files and indicate differences between each of the files. Such comparisons may be made since the problem domain is known and the semantic content of the files is understood. The differences between the two files provided by such comparisons are acceptable.

A need exist, however, to compare and obtain the difference between items such as models where the problem domain is unknown and the semantic content of the models is not understood. Accordingly, a comparison can be made between models without having to know the specific format of the data, nor what the data represents. As a result, a generic comparison tool and method may be created.

SUMMARY OF THE INVENTION

An aspect of the present invention provides a method for comparing a first model and a second model. The method includes identifying metadata in the first and second model, and calculating a first set of signatures for objects of the metadata of the first model and a second set of signatures for objects of the metadata of the second model. The objects of the first model and the second model corresponding with each other have the same signatures. The method also includes determining which signatures of the first set of signatures match signatures of the second set of signatures. The method also includes determining for the matching signatures whether the objects associated with the signatures of the first set of signatures equal the objects associated with the signatures of the second set of signatures.

Another aspect of the present invention provides determining whether the objects associated with the signatures of the first set of signatures equal the objects associated with the signatures of the second set of signatures. The step of determining includes determining whether an owner of at least one object associated with the signatures of the first set of signatures matches an owner of at least one object associated with the signatures of the second set of signatures. The step of determining also includes determining whether at least one ownee of the at least one object associated with the signatures of the first set of signatures equal at least one ownee of the at least one object associated with the signatures of the second set of signatures. The step of determining also includes determining whether at least one non-reference property of the at least one object associated with the signatures of the first set of signatures equals at least one non-reference property of the at least one object associated with the signatures of the second set of signatures. The step of determining also includes determining whether at least one reference property of the at least one object associated with the signatures of the first set of signatures match at least one non-reference property of the at least one object associated with the signatures of the second set of signatures.

DETAILED DESCRIPTION OF THE INVENTION

Figure 1:
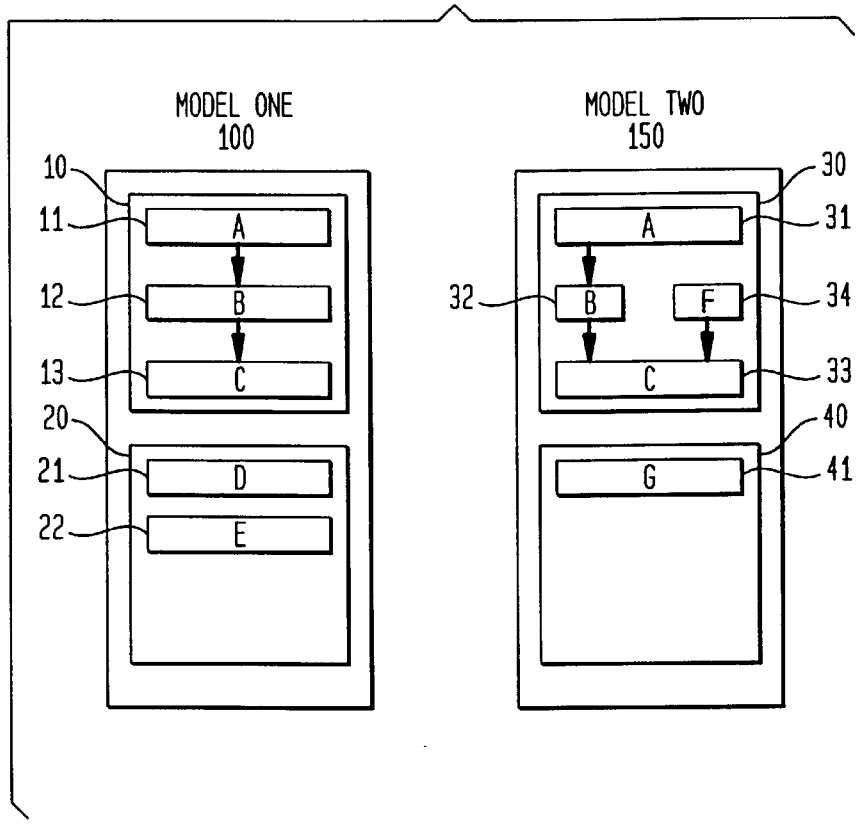
FIG. 1 illustrates a block diagram of two models including metadata and objects in accordance with an exemplary embodiment of the present invention.

FIG. 1 illustrates an exemplary embodiment of a pair of models 100, 150, i.e., Model One 100 and Model Two 150, such as the object/property model disclosed in co-pending U.S. patent application Ser. No. 09/420,223, filed on Oct. 15, 1999, entitled APPARATUS AND METHOD FOR MODELING TOOLS, the disclosure of which is incorporated by reference herein in its entirety thereto. As shown in FIG. 1, Model One 100 includes Metadata A and B 10, 20, respectively, and Objects A–E 11, 12, 13, 21, 22, respectively, and Model Two 150 includes Metadata A and C 30, 40, respectively, and Objects A–C, F, G 31, 32, 33, 34, 41, respectively, in accordance with an exemplary embodiment of the present invention. Metadata A, B, A, C 10, 20, 30, 40, respectively, is information about data; the data may be objects belonging to the metadata. For example, metadata may be a type "cars" and the data described by that metadata may be objects such as specific brands of cars, i.e., Ford™, Chrysler™, etc.

FIG. 1 illustrates Model One 100 and Model Two 150 having common metadata, i.e., like metadata, Metadata A 10, 30. FIG. 1 also illustrates Model One 100 and Model Two 150 having uncommon metadata, for example, Metadata B 20 and Metadata C 40. For purely illustrative purposes, FIG. 1 shows objects grouped together according to like metadata such as Metadata A 10 and Metadata A 30 in Model One 100 and Model Two 150, respectively. Like metadata 10, 30, however, may be spread randomly in any given model.

FIG. 1 shows Model One 100 having Object A 11, Object B 12 and Object C 13 being described by Metadata A 10 in which Object A 11 owns Object B 12 and Object C 13, and Object B 12 owns Object C 13. An object own another object if the objects are in a hierarchical relationship and the owning object, i.e., owner, is at a higher level than the object being owned, i.e., ownee. An ownee is an object that is aggregated into an owner, i.e., a constituent component of the owner.

Further, in Model One 100, Object C 13 and Object B 12 are the ownees of Object A 11 and Object C 13 is the ownee of Object B 12. In Model One 100, Object D 21 and Object E 22 are described by Metadata B 20. As a hierarchical relationship does not exist between Object D 21 and Object E 22, one is not an owner or ownee of the other.

FIG. 1 shows Model Two 150 having Object A 31, Object B 32, Object C 33, and Object F 34 being described by Metadata A 30 in which Object A 31 owns Object B 32 and Object C 33, Object F 34 and Object B 32 own Object C 33. Further, in Model Two 150, Object C 33 and Object B 32 are the ownees of Object A 31 and Object C 33 is the ownee of Object B 32 and Object F 34. In Model Two 150, Object G 41 is described by Metadata C 40. As a hierarchical relationship does not exist with Object G 41 with respect to other objects, Object G 41 is not an owner or ownee.

Objects may include properties, for example, non-reference properties and reference properties. A reference property includes a pointer or address that points to, for example, another property or object. A non-reference property includes a value not a pointer. If an object is deleted so are the objects and properties that it owns. Each of the objects not owned by the object being deleted, however, will still exist upon the object being deleted.

Figure 2:
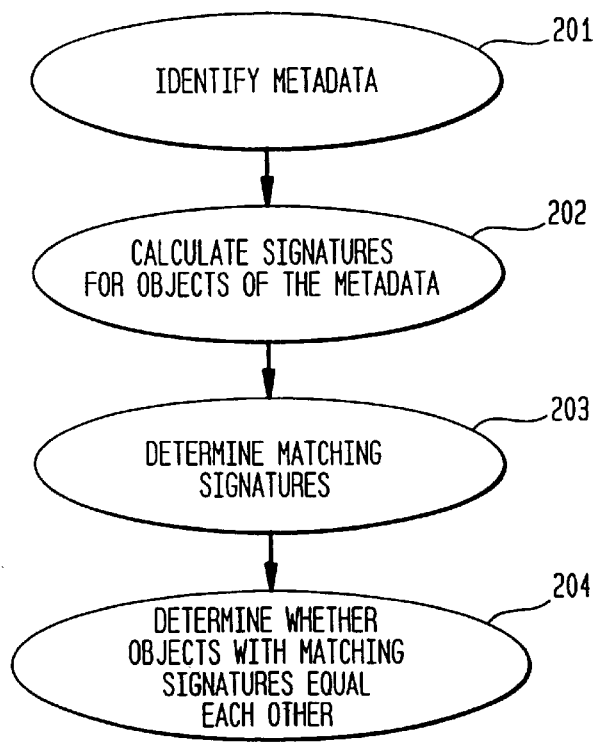
FIG. 2 illustrates a flow diagram of an exemplary embodiment of a method of the present invention for determining differences between models.

FIG. 2 is a flow diagram of an exemplary embodiment of the present invention for comparing models to determine the differences, if any, between the models. As shown in FIG. 2, in 201, metadata is identified in Model One 100 and Model Two 150. For example, as shown in FIG. 1, identifying the metadata may result in identifying common metadata, i.e., Metadata A 10, 30 in Model One 100 and Model Two 150, respectively.

In 202, signatures are calculated for objects of the metadata identified in step 201. The signatures calculated for respective objects in FIG. 1 and FIG. 2 that correspond with each other will have the same signature. For example, in FIG. 1, Objects A 11, 31 of Model One 100 and Model Two 150, respectively, correspond with each other. Accordingly, Objects A 11, 31 in Model One 100 and Model Two 150, respectively, will have the same signature. Similarly, Objects B 12, 32 and C 13, 33 correspond with its respective objects in Model One 100 and Model Two 150, respectively. Thus, each of Objects B 12, 32 and each of Objects C 13, 33 will have the same signatures, respectively. Objects, however, that do not have corresponding objects, for example, Objects D 21, E 22, F 34 and G 41 will have a signature calculated that uniquely identifies each of the objects. Objects corresponding with each other are parallel objects. In an exemplary embodiment of the present invention, the calculation of the signatures of the objects may be based on at least the metadata which describes the objects.

In 203, it is determined which signatures in Model One 100 and Model Two 150 match. Signatures match if they are the same. Accordingly, parallel objects have matching signatures. In 204, whether objects of Model One 100 and Model Two 150 having matching signatures are equal is determined.

Figure 3:
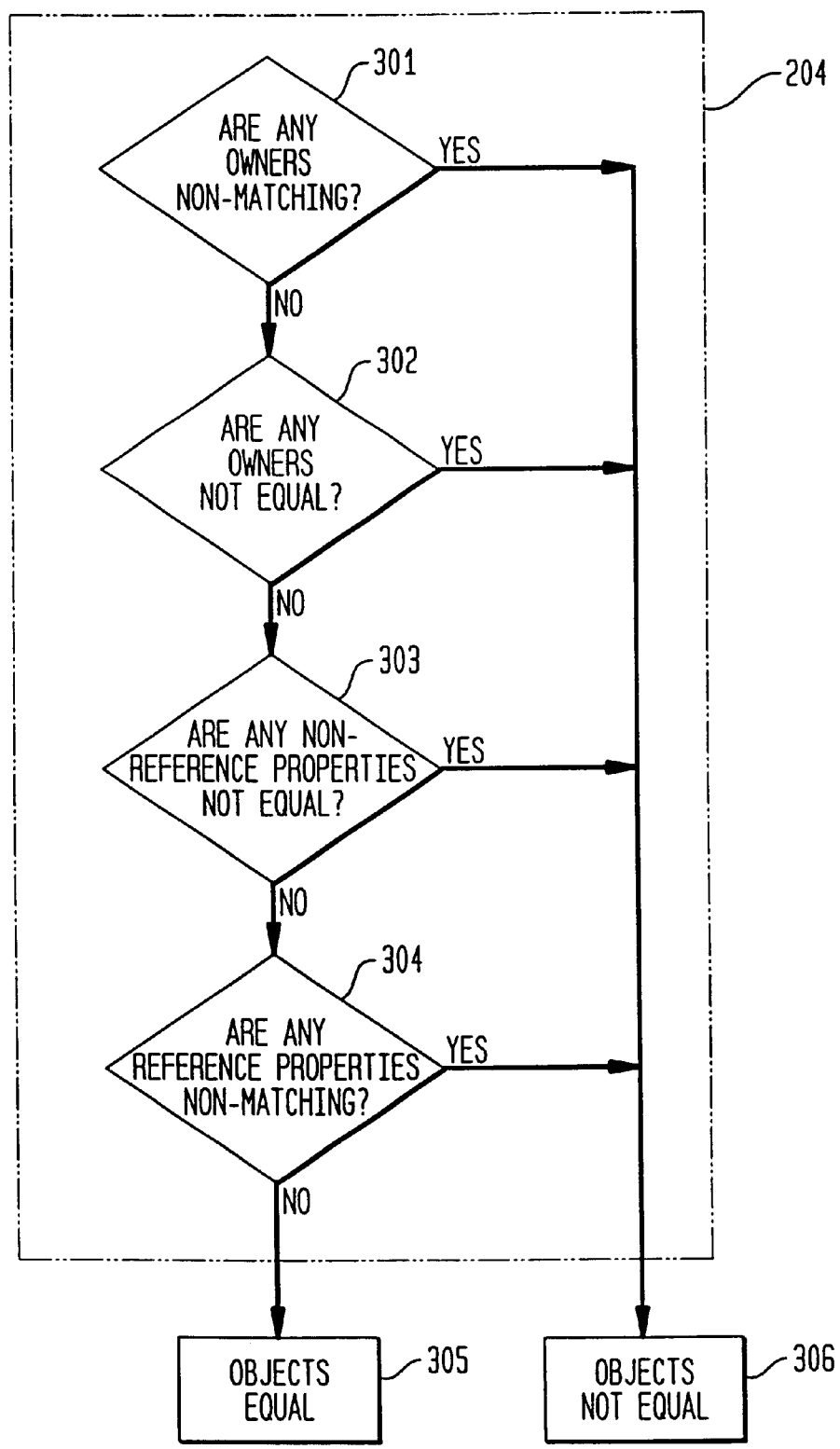
FIG. 3 illustrates a flow diagram of an exemplary embodiment of conditions of the present invention for determining equality of objects.

In an exemplary embodiment of the present invention, determining whether objects with matching signatures are equal may include whether or not a series of conditions such as whether any non-matching owners exist and whether any ownees, reference properties and non-reference properties are not equal are satisfied. FIG. 3 illustrates an exemplary embodiment of a method of the present invention for determining whether respective objects having matched signatures are equal. If each of the conditions 301, 302, 303, 304 are not satisfied, the respective objects having matching signatures are equal. If any one of the conditions 301, 302, 303, 304 are satisfied, the respective objects having matching signatures are not equal. For each of the respective matched signatures, a determination is made whether any of their respective owners do not match as illustrated in 301. In FIG. 1, for example, for Objects B 12, 32 in Model One 100 and Model Two 150, all of the owner(s) are the same-Objects A 11, 31. In contrast, Objects C 13, 33 in Model One 100 and Model Two 150 are not equal because there are non-matching owners. Object C 13 of Model One 100 does not have Object F 34 as an owner, however, Object C 33 of Model Two 150 does have Object F 34 as an owner.

In 302, for respective objects having matched signatures not having non-matched owners, a determination is made whether any ownees are not equal, as opposed to just matching. In FIG. 1, for example, Objects B 12, 32 in Model One 100 and Model Two 150, respectively, do not have any unequal ownees. Objects C 13, 33 are respectively owned by each of the Objects B 12, 32 and Objects B 12, 32 do not have any other ownees.

In 303, for respective objects of the matched signatures not having non-matched owners and not having unequal ownees, a determination is made whether any non-reference properties are not equal. A non-reference property is not equal if the binary representations of the values are not the same. In 304, for respective objects of the matched signatures not having non-matched owners, not having unequal ownees and not having non-referenced properties that are not equal, a determination is made whether any reference properties are not matched. In an exemplary embodiment of the present invention, if any of the four conditions 301, 302, 303, 304 are satisfied, the models 100, 150 include differences. If none of the four conditions 301, 302, 303, 304 are satisfied, the models 100, 150 will not have differences with respect to each other.

The differences between Model One 100 and Model Two 150 of FIG. 1 are Model One 100 includes Object D 21 and Object E 22 which is not included in Model Two 150. Also, Model One 100 does not include Object F 34 included in Model Two 150. Further, Object C 13 of Model One 100 matches but does not equal Object C 33 of Model Two 150.

In another embodiment of the present invention, synchronization may be performed to models 100, 150 having differences between them. Synchronization is achieved by alleviating the differences between models 100, 150 such as changing memory images in one or both of the models 100, 150 so that the memory images in the models 100, 150 are the same. For example, when an object such as an owner or ownee exists in one model but not in the other model, the missing object may be created in the model not previously having the object. As shown in FIG. 1, for example, Model One 100 is missing Object F 34 of Model Two 150. As a result, missing Object F 34 can be created in Model One 100. Furthermore, when an object exists in one model but not in another model, the object may be removed from the appropriate model. For example, since Object D 21 and Object E 22 of Model One 100, shown in FIG. 1, are not present in Model Two 150, they 21, 22 may be removed from Model One 100. Approaches similar to the ones previously described can also be used when a property exists or has a different value for an object in one model with respect to a parallel object in another model.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. A method for comparing a first model and a second model, comprising:

identifying metadata in the first model and in the second model;

calculating a first set of signatures for objects of the metadata of the first model and a second set of signatures for objects of the metadata of the second model, wherein the objects of the first model and the objects of the second model corresponding with each other have the same signatures;

determining which signatures of the first set of signatures match signatures of the second set of signatures; and determining for the matched signatures whether the objects associated with the signatures of the first set of signatures equal the objects associated with the signatures of the second set of signatures.

2. The method for comparing a first model and a second model as set forth in claim 1, wherein the step of determining whether the objects associated with the signatures of the first set of signatures equal the objects associated with the signatures of the second set of signatures, further comprising:

determining whether an owner of at least one object associated with the signatures of the first set of signatures matches an owner of at least one object associated with the signatures of the second set of signatures;

determining whether at least one ownee of the at least one object associated with the signatures of the first set of signatures equal at least one ownee of the at least one object associated with the signatures of the second set of signatures;

determining whether at least one non-reference property of the at least one object associated with the signatures of the first set of signatures equals at least one non-reference property of the at least one object associated with the signatures of the second set of signatures; and determining whether at least one reference property of the at least one object associated with the signatures of the first set of signatures match at least one non-reference property of the at least one object associated with the signatures of the second set of signatures.

3. The method for comparing the first model and the second model as set forth in claim 1, further comprising:

synchronizing at least one memory image of the first model with at least one memory image of the second model when at least one of object associated with the signatures of the first set of signatures are unequal to at least one object associated with the signatures of the second set of signatures.

* * * * *